United States Patent [19]
Claflin et al.

[11] Patent Number: 5,819,798
[45] Date of Patent: Oct. 13, 1998

[54] MULTIPORT ROTARY INDEXING VACUUM VALVE IN A LIQUID INK PRINTER

[75] Inventors: Alfred J. Claflin; David G. Anderson, both of Ontario, N.Y.

[73] Assignee: Xerox Corporation, Stamford, Conn.

[21] Appl. No.: 753,658

[22] Filed: Nov. 27, 1996

[51] Int. Cl.⁶ .................................................. E03B 31/00
[52] U.S. Cl. ..................... 137/625.11; 251/180; 251/162; 74/527
[58] Field of Search ........................... 137/625.11, 625.17, 137/625.46; 251/180, 162, 251, 252, 230, 253, 254; 74/527, 56

[56] References Cited

U.S. PATENT DOCUMENTS

| | | | |
|---|---|---|---|
| 2,096,528 | 10/1937 | Saunders | 251/254 |
| 2,529,544 | 11/1950 | Ebert | 251/162 |
| 3,082,791 | 3/1963 | Miller | 251/180 |
| 3,088,340 | 5/1963 | Shotey | 74/527 |
| 3,096,665 | 7/1963 | Cappelle et al. | 74/527 |
| 3,586,049 | 6/1971 | Adamson | 137/625.41 |
| 3,846,912 | 11/1974 | Newbould | 74/527 |
| 4,427,177 | 1/1984 | Constantinescu et al. | 251/230 |
| 4,908,638 | 3/1990 | Albosta et al. | 346/140 R |
| 5,206,666 | 4/1993 | Watanabe et al. | 346/140 R |
| 5,257,044 | 10/1993 | Carlotta et al. | 346/140 R |
| 5,367,326 | 11/1994 | Pond et al. | 347/22 |

FOREIGN PATENT DOCUMENTS

| | | | |
|---|---|---|---|
| 76451 | 4/1983 | European Pat. Off. | 137/625.11 |
| 325200 | 7/1989 | European Pat. Off. | 137/625.46 |
| 1504281 | 3/1978 | United Kingdom | 137/625.46 |

OTHER PUBLICATIONS

International Publication No. WO 82/00696; Mar. 4, 1982; Wilson.

*Primary Examiner*—Denise L. Ferensic
*Assistant Examiner*—John Ball
*Attorney, Agent, or Firm*—Tallam I. Nguti

[57] ABSTRACT

A multiple port rotary indexing vacuum valve in a liquid ink printer including a selecting member and a multiple port member. The selecting member, defines an aperture therethrough and a first axis, including a first oscillatory surface. The multiple port member defines a plurality of ports and a second axis, including a second oscillatory surface wherein the second oscillatory surface is matable with the first oscillatory surface so that relative movement therebetween aligns the aperture of the selecting member with one of the plurality of ports of the multiple port member.

12 Claims, 4 Drawing Sheets

MULTIPORT ROTARY INDEXING VACUUM VALVE IN A LIQUID INK PRINTER

FIELD OF THE INVENTION

The present invention relates generally to liquid ink recording apparatus and more particularly relates to a multiport indexing vacuum valve for a maintenance system therefore.

BACKGROUND OF THE INVENTION

Liquid ink printers of the type frequently referred to as continuous stream or as drop-on-demand, such as piezoelectric, acoustic, phase change wax-based or thermal, have at least one printhead from which droplets of ink are directed towards a recording sheet. Within the printhead, the ink is contained in a plurality of channels. Power pulses cause the droplets of ink to be expelled as required from orifices or nozzles at the end of the channels.

In a thermal ink-jet printer, the power pulses are usually produced by resistors, each located in a respective one of the channels, which are individually addressable to heat and vaporize ink in the channels. As voltage is applied across a selected resistor, a vapor bubble grows in the associated channel and initially bulges from the channel orifice followed by collapse of the bubble. The ink within the channel then retracts and separates from the bulging ink thereby forming a droplet moving in a direction away from the channel orifice and towards the recording medium whereupon hitting the recording medium a dot or spot of ink is deposited. The channel is then refilled by capillary action, which, in turn, draws ink from a supply container of liquid ink. Operation of a thermal ink-jet printer is described in, for example, U.S. Pat. No. 4,849,774.

The ink jet printhead may be incorporated into either a carriage type printer, a partial width array type printer, or a page-width type printer. The carriage type printer typically has a relatively small printhead containing the ink channels and nozzles. The printhead can be sealingly attached to a disposable ink supply cartridge and the combined printhead and cartridge assembly is attached to a carriage which is reciprocated to print one swath of information (equal to the length of a column of nozzles), at a time, on a stationary recording medium, such as paper or a transparency. After the swath is printed, the paper is stepped a distance equal to the height of the printed swath or a portion thereof, so that the next printed swath is contiguous or overlapping therewith. This procedure is repeated until the entire page is printed. In contrast, the page width printer includes a stationary printhead having a length sufficient to print across the width or length of a sheet of recording medium at a time. The recording medium is continually moved past the page width printhead in a direction substantially normal to the printhead length and at a constant or varying speed during the printing process. A page width ink-jet printer is described, for instance, in U.S. Pat. No. 5,192,959.

It has been recognized that there is a need to maintain the ink ejecting nozzles of an ink jet printhead, for example, by periodically cleaning the orifices when the printhead is in use, and/or by capping the printhead when the printer is out of use or is idle for extended periods of time. The capping of the printhead is intended to prevent the ink in the printhead from drying out. There is also a need to prime a printhead before use, to insure that the printhead channels are completely filled with ink and contain no contaminants or air bubbles and also periodically to maintain proper functioning of the orifices. Maintenance and/or priming stations for the printheads of various types of ink jet printers are described in, for example, U.S. Pat. No. 4,855,764, U.S. Pat. No. 4,853,717 and U.S. Pat. No. 4,746,938. Removal of gas from the ink reservoir of a printhead during printing is described in U.S. Pat. No. 4,679,059.

It has been found that to properly maintain an ink jet printhead two separate operations must be performed. In a first operation, a maintenance assembly is typically used to maintain proper condition or operation of the printhead nozzles by priming the nozzles, by wiping clean the nozzle face of the printhead, or by vacuuming the face of the printhead to remove any contaminants or ink which may have collected thereon. The second operation is to cap the printhead if the printhead nozzles will be exposed to air for extended periods of time to thereby prevent the ink contained in the nozzles from drying out. To prevent drying, a cap is brought into contact with a printhead to form a substantially airtight seal with the face of the printhead and around the nozzles.

Various methods and apparatus for maintaining the condition of ink jet printheads and for capping ink jet printheads are illustrated and described in the following disclosures which may be relevant to certain aspects of the present invention.

U.S. Pat. No. 4,908,638 to Albosta et al., describes an n-way selecting mechanism for selecting inks from a number of ink supply containers for delivery to the marking head of an ink jet printer. The selecting mechanism includes a rotary diverting valve which is positioned to allow the marking head to receive ink from on color supply container or another supply container.

U.S. Pat. No. 3,586,049 to Adamson describes an oscillatory valve for selectively connecting three inlets to an outlet.

U.S. Pat. No 5,206,666 to Watanabe et al., an ink jet recording apparatus having a full-line type recording head rotatably supported between a recording position and a non-recording position is described. A cleaning member contacts the recording head during rotation of the recording head to remove deposited ink or foreign matter. In the non-recording position, the printhead is capped.

U.S. Pat. No. 5,257,044 to Carlotta et al. describes a cap actuation mechanism for use in a maintenance station for an ink jet printhead in a scanning type ink jet printer. A cap located on a cap carriage in an ink jet printer maintenance station provides the functions of printhead nozzle capping, priming, cleaning, refreshing, as well as waste ink management.

U.S. Pat. No. 5,367,326 to Pond et al. describes a pagewidth ink jet printer having a movable cleaning/priming station adapted for movement parallel to and along an array of printhead nozzles. The cleaning and priming station is slidingly moved along a ledge surface so that the cleaning and priming station is maintained a fixed distance from the face of the printhead.

SUMMARY OF THE INVENTION

In accordance with one aspect of the present invention, there is provided a multiple port rotary valve including a selecting member, defining an aperture therethrough and a first axis, including a first oscillatory surface, and a multiple port member, defining a plurality of ports and a second axis, including a second oscillatory surface, the second oscillatory surface being matable with the first oscillatory surface so that relative movement therebetween aligns the aperture of the selecting member with one of the plurality of ports of the multiple port member.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

Figure 1:
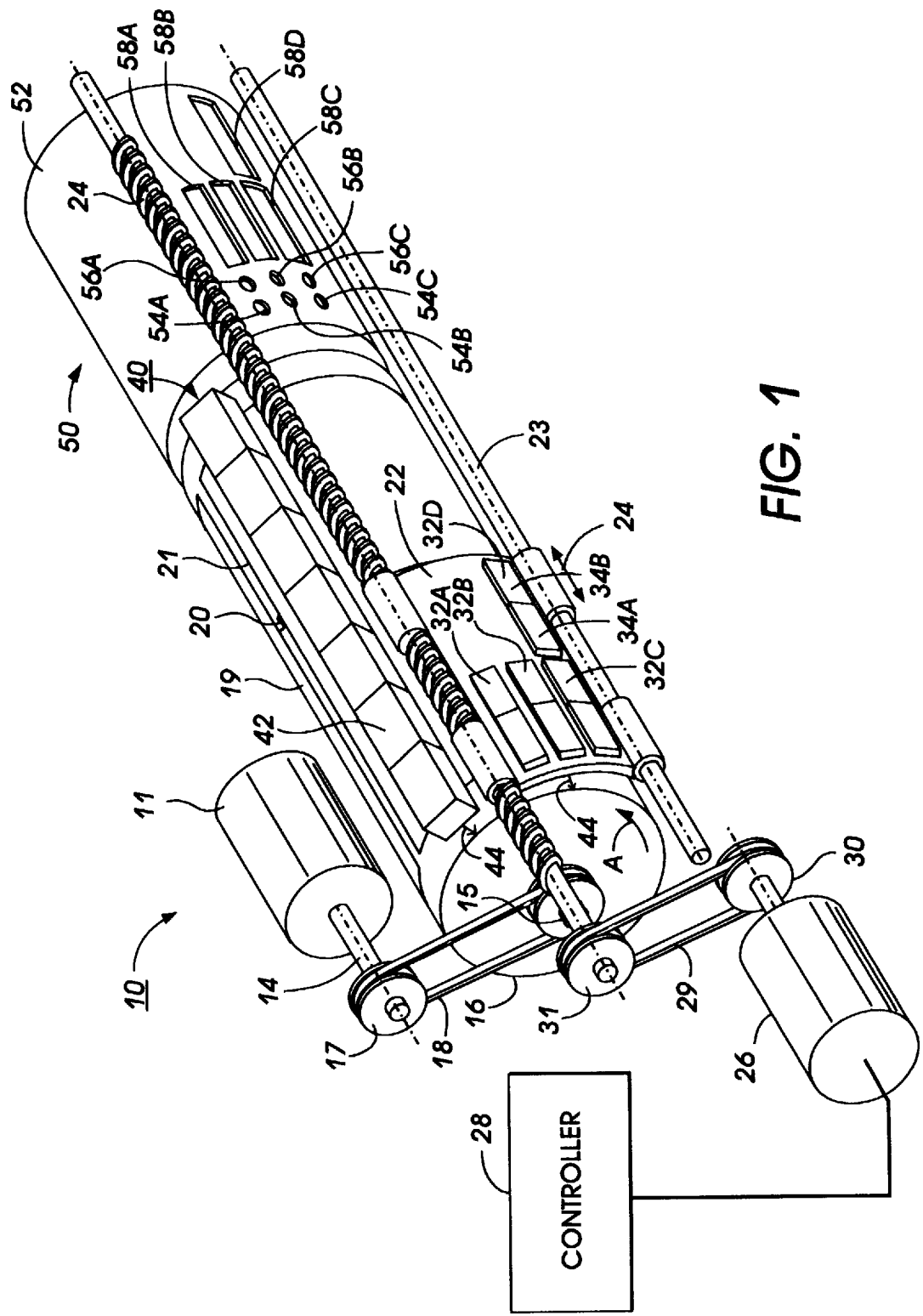
FIG. 1 illustrates a partial perspective view of a liquid ink printer having a plurality of partial width array printheads and a pagewidth printbar for ink jet printing.

FIG. 1 illustrates the essential components of a printing apparatus, generally designated 10, in which the outside covers or case and associated supporting components of the printing apparatus are omitted for clarity. The printing apparatus 10 includes a motor 11 connected to a suitable power supply (not shown) and arranged with an output shaft 14 parallel to an axis 15 of a cylindrical drum 16 which is supported for rotation on bearings (not shown). A pulley 17 permits direct engagement of the output shaft 14, to a drive belt 18 for enabling the drum 16 to be continuously rotationally driven by the motor 11 in the direction of an arrow A at a predetermined rotational speed.

A recording medium 19, such as a sheet of paper or a transparency, is placed over an outer surface 20 of the drum 16, with a leading edge 21 attached to the surface 20 before printing to enable attachment of the sheet thereto either through the application of a vacuum through holes in the drum 16 (not shown) or through other means of holding such as electrostatic. As the drum 16 rotates, the sheet of paper 19 is moved past a printhead carriage 22 supported by a lead screw 24 arranged with the axis thereof parallel to the axis 15 of the drum 16 and supported by fixed bearings (not shown) which enable the carriage 22 to slidably translate axially. A carriage rail 23 provides further support for the carriage as the carriage moves in the direction of arrow 24 perpendicular to the moving direction of the sheet 21. A second motor 26, such as a stepper motor or other positioning mechanism, controlled by a controller 28, drives the lead screw with a second belt 29 connecting a clutch 30 and a clutch 31 attached to the lead screw 24 for movement thereof.

The printhead carriage 22 advances a first partial width array printbar 32A, a second partial width array printbar 32B, a third partial width array printbar 32C, and a fourth partial width array printbar 32D in the direction of arrow 24 for printing on the sheet 21. The first, second and third partial width array printbars 32A–C, respectively, each print one of the colors cyan, magenta or yellow for color printing. The fourth partial width array printbar 32D prints black when necessary, especially when printing graphics.

Each individual printbar 32A–32D include a first printhead die 34A and a second printhead die 34B butted together and mounted on a substrate (not shown) which can be made of a material such as graphite or metal. Each of the printhead dies 34A and 34B include several hundred or more nozzles which are fired sequentially in bank of nozzles. All of the printhead die are fired in parallel for one full printing of all the partial width arrays 32 on the carriage 22.

In addition to the partial width arrays 32, the printer 10 includes a full-width array or pagewidth printbar 40 supported by an appropriate support structure (not shown) above the drum 16 for printing on the recording medium 21. The pagewidth printbar 40 has a length sufficient to print across the entire width (or length) of the recording medium during a single pass of the recording medium beneath the printbar. The printbar 40 includes a plurality of printhead subunits 42 affixed to a supporting substrate (not shown) in an abutted fashion, as taught by U.S. Pat. No. 5,198,054 to Drake at al. and incorporated herein by reference. Alternatively, individual subunits 42 may be spaced from one another by a distance approximately equal to the length of a single subunit and bonded to opposing surfaces of the supporting substrate. In one embodiment, subunits 42 may be similar in construction to U.S. Pat. No. 4,774,530 to Hawkins, the relevant portions of which are incorporated herein by reference.

The forward facing edges of the subunits 34 and the subunits 42 contain ink jet printhead having droplet ejecting orifices or nozzles (not shown) which eject ink along a trajectory 44 substantially perpendicular to the surface of the recording medium 21. Printed wiring boards (not shown) contain circuitry required to interface and cause the individual heating elements (not shown) in the subunits to eject ink droplets from the nozzles. While not shown in FIG. 1, the printed wiring boards are connected to individual contacts contained on the subunits via a commonly known wire bonding technique. The data required to drive the individual heating elements of the printhead subunits is supplied from an external system by a standard printer interface, modified and/or buffered by a printer micro processor (not shown) within the printer and transferred to the printheads by ribbon cables (not shown) attached thereto.

The printing apparatus 10 also includes a maintenance system 50 located at one end of the drum 16. The maintenance system 50 includes assemblies which provide wet wiping of the nozzles of the printheads 32 and 34 as well as vacuuming of the same printheads for maintenance thereof. The wet wipe nozzles and vacuum nozzles shown in U.S. patent application Ser. No. 08/566,472, having the title Fluid Applicator for Maintenance of Liquid Ink Printers, and a filing date of Dec. 4, 1995, herein incorporated by reference, can be used. The wet wipe nozzles are located within a stationary drum housing 52 and extend through a plurality of apertures 54A, 54B and 54C when necessary to provide maintenance functions. When the printhead carriage moves to the maintenance position, the wet wipers apply a fluid to the ink jet nozzles such that any dried ink, viscous plugs or other debris is loosened on the front face of the ink jet printbars. Once the debris has been sufficiently loosened, a plurality of vacuum nozzles each extending through a plurality of vacuum nozzle apertures 56A–56C vacuum away any of the cleaning fluid as well as debris loosened thereby.

Once a printing operation has been completed and any cleaning of the printbars has been completed, if necessary, the carriage 22 is moved into position above a plurality of apertures 58A–58D. A plurality of capping members disposed within the housing 50, are moved into contact with the front faces of the printbars 32 and 34 through the apertures 58 to thereby cap the printbars to substantially prevent any ink which has been collected in the nozzles of the printbars from drying out. The cap members are also used in a priming operation to be described later with reference to FIG. 2.

Figure 2:
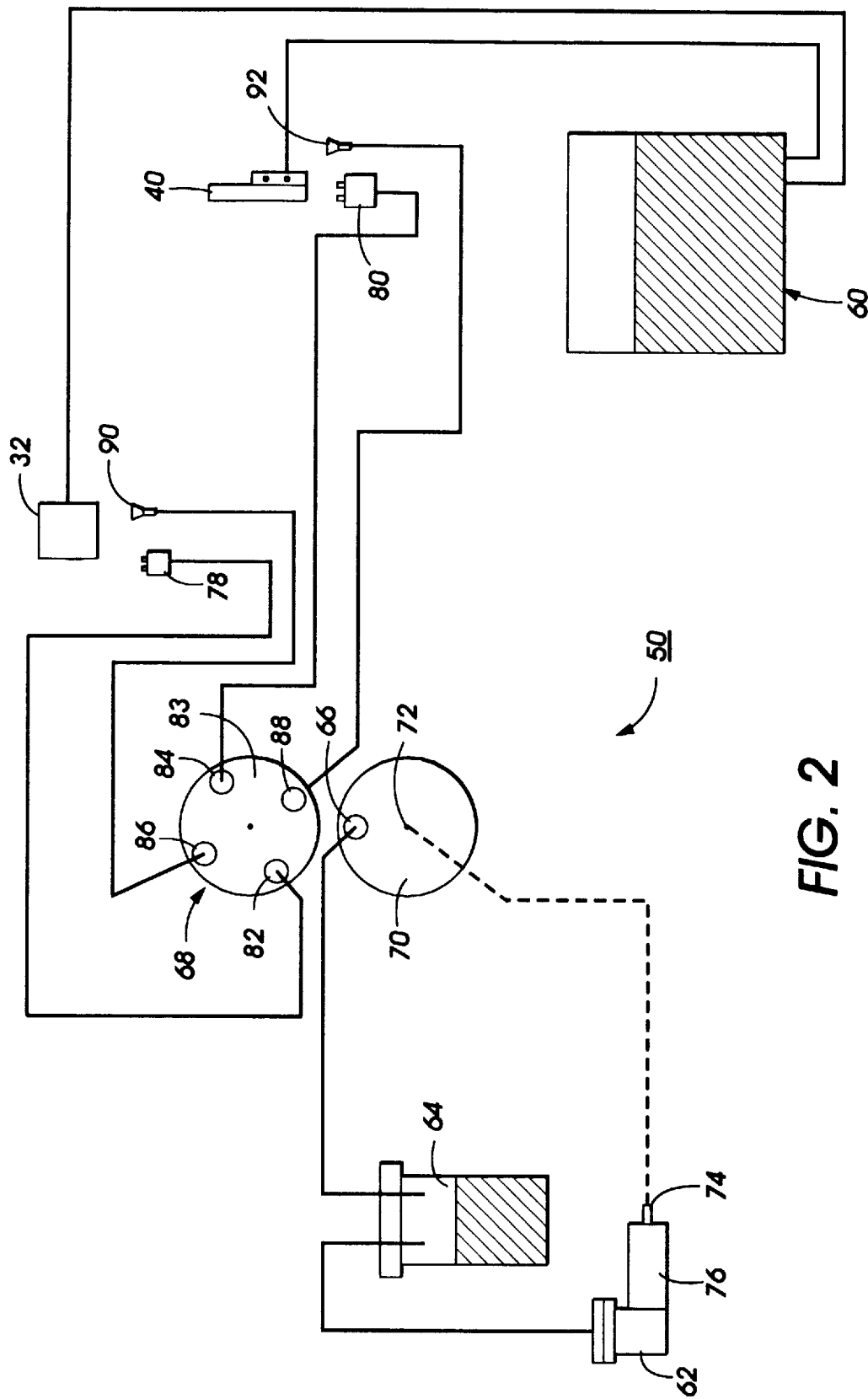
FIG. 2 illustrates a fluid/air schematic diagram of an ink reservoir, a vacuum source, and a multiport rotary indexing valve and connections thereof for a maintenance system of the liquid ink printer.

FIG. 2 illustrates a fluid/air schematic diagram of the maintenance system 50 showing the vacuum supply lines coupled to vacuum nozzles for both the full width array printbar 40 as well as for one of the partial width array printbars 32 and an ink reservoir 60 for supplying ink to not only the full width array printbar 40 but also to each of the partial width array printbars. A vacuum pump 62, such as a diaphragm pump or other vacuum generating devices, generates a vacuum through a waste sump which is connected to an inlet 66 of a two piece multi-position rotary valve 68 which is used to select and apply either a vacuum for cleaning the faces of the printheads or for applying a vacuum used to prime the printheads during a priming operation which is typically necessary before the start of printing or oftentimes when the printheads lose prime. A selecting member 70 of the rotary valve includes the aperture 66 and rotates about an axis 72. A shaft 74 extends through the stepper motor and is coupled to the vacuum pump 62, such that the stepper motor 76 drives not only the vacuum pump but the rotary valve.

To begin printing, each of the printheads are primed by drawing ink from the ink reservoir 60 through the printheads and into a capping members 78 associated with the partial width printhead arrays 32 and through a capping member 80 used to prime as well as to cap the full width array printbar 40. During a priming operation for the partial width array 32, the aperture 66 of the rotary valve 68 is moved by the stepper motor 76 into alignment with an aperture 82 of a stator or multiple port member 83. When the aperture 66 is aligned with the aperture 82 of the rotary valve 90, a vacuum is applied for priming the partial width array printhead. An aperture 84 of the rotary valve 68 provides for priming of the full width array 40.

After printing has been completed, or at other times when a maintenance operation is necessary, the aperture 66 is aligned with either an aperture 86 which is used to apply a vacuum to the front face of the printhead nozzles of printhead 32 or is used to apply a vacuum through an aperture 88 to the full width array printhead. Through the use of the multi-positioned rotary valve, the vacuum supplied by the vacuum pump 62 is used not only to provide for initial filling of the ink manifolds of each of the printbars but is also used to vacuum the nozzles during a maintenance operation through vacuum nozzles 90 and 92. In this operation, the capping members 78 and 80 would be moved out of the capping position and vacuum nozzles 90 and 92 would be moved into position, all by the stepper motor 76.

Figure 3:
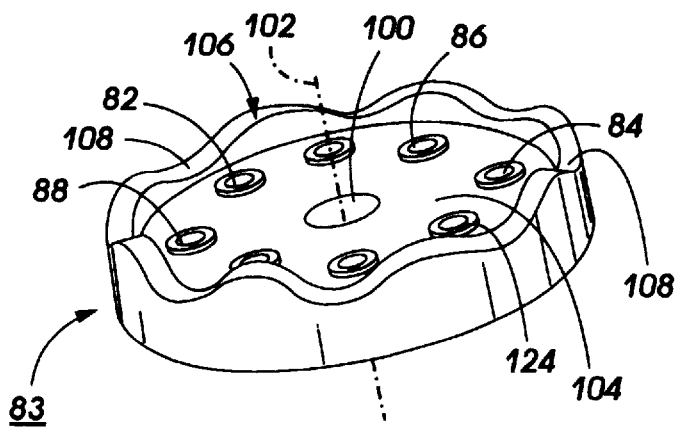
FIG. 3 illustrates a perspective view of a stator of the multiport rotary indexing valve of FIG. 2.

FIG. 3 illustrates a perspective view of the stator or multiple port member 83 of the multiple port rotary indexing valve 68. The multi port member 83 cooperates with the rotor or selecting member 70 of FIG. 4 to provide communication of a single source of fluid or gas, in the illustrated instance a vacuum source, to a number of fluid inlet ports of the multiple port member 83. While four ports 82, 84, 86, and 88 were illustrated in FIG. 2 and are shown in FIG. 3, the number of ports can be any number including two or greater. The valve 68 including the selecting member 70 and the multiple port member 83 provides the ability to toggle the applied vacuum between the vacuum passages to multiple print elements or printbars at the required timing as previously described. The valve also allows the ability to apply a vacuum to the print elements/print bar to initially fill their respective ink manifolds, also previously described. As can be seen, the rotor-stator combination provides a unique oscillating camming surface that serves to register the ports with the aperture 66.

Figure 4:
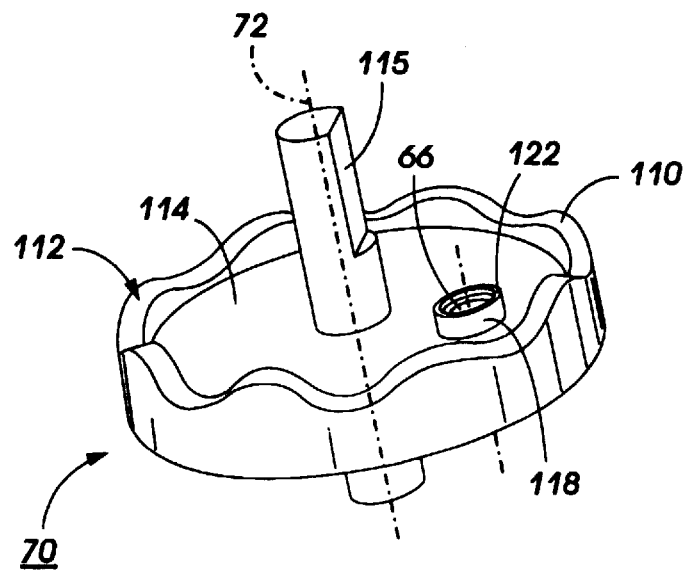
FIG. 4 illustrates a perspective view of a rotor of the multiport rotary indexing valve of FIG. 2.

In the preferred embodiment as illustrated in FIGS. 3 and 4, an eight lobed sign wave matched cam set of the rotor 70 and the stator 83 provides a harmonic cam to give smooth motion when selecting various ports but still provides a fast enough rise to separate the aperture 66 away from the individual ports of the multi-port member 83. This feature significantly reduces the wear on any seal which exists between the aperture 66 and the ports 82, 84, 86 and 88 and allows the use of standard compliant materials such as silicone to reduce the sealing forces required. This is in contrast with current rotary valve technology, such as a Hamilton rotary valve which requires exacting tolerances and can be cost prohibitive. Other known rotary valve alternatives do not offer port registration for multiple ports without an exact positioning method when actuating the rotor to the next port position.

As illustrated in FIG. 3, the multiple port member 83 includes an aperture 100 aligned along an axis 102 of the member 83. A substantially flat surface 104 defines each of the ports. Circumscribing the substantially flat surface is an oscillatory surface 106 which defines an oscillating or repeating pattern which varies in the direction of the axis 102. The oscillating surface also defines a circle around the aperture 100 such that the circumference thereof is substantially equidistant from the axis 102. As can be seen, each of the ports is located along a line connecting the axis 102 to a trough 108 of the oscillating surface 106. This feature provides for the correct alignment of the aperture 66 of the selecting member 70 with each of the ports of the multiple port member 83, since the aperture 66 is located along a line connecting the axis 72 to a rise 110 of an oscillatory surface 112 of the selecting member 70 which is complementary and matable with the surface 106. The oscillatory surface 112 circumscribes a substantially flat surface 114 of the selecting member which defines the aperture 66. A shaft 115 is fixably attached to the rotor 70 such that rotation of the shaft moves the aperture 66 with respect to the ports while the stator 83 is held in a fixed position by, for instance, attachment to a frame of the printer. The shaft 115 is inserted through the aperture 100 for completion of the valve. This embodiment offers the ability to register the aperture 66 with the ports of the multiple port member 83 by detenting the crest of one oscillatory surface with the trough of the other oscillatory surface in eight positions. In addition, the oscillatory surfaces or camming surfaces may be tailored to suit the displacement/force profiles for any integral number multi-ported/multi-lobed valve. Due to this displacement feature, the power source providing rotation to the member 70 may be a device that provides sufficient torque for rotation without the requirement for precise servo location techniques since the valve itself is self locating within a generous tolerance band.

Figure 5:
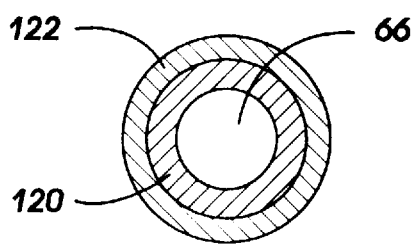
FIG. 5 illustrates a connector of the rotor of FIG. 4.

To provide complete and accurate sealing of the aperture 66 with any of the ports of the member 83, the sealing member 70 includes a connector or projecting portion 118 which extends away from the substantially flat surface 114. The projecting portion 118 defines the aperture 66 and as illustrated in a plan view of FIG. 5, includes a single dove tailed groove defined by a first surface 120 which is offset from and recessed from a second surface 122. The dove tailed groove defined by the surface 120 and the surface 122 provides for a press fit with a plurality of O-rings 124 each of which surrounds the ports of the multiple port member 83. As the rotor rotates from a sealed position, the projecting portion rises quickly away from the sealing portion of the stator 83 thereby eliminating any shear forces that ultimately wear at this interface. This allows for the ability to use soft materials that may not ordinarily be used in such applications with the advantages of lower normal forces with respect to each of the pieces such that an effective seal can be made thereby.

Figure 6:
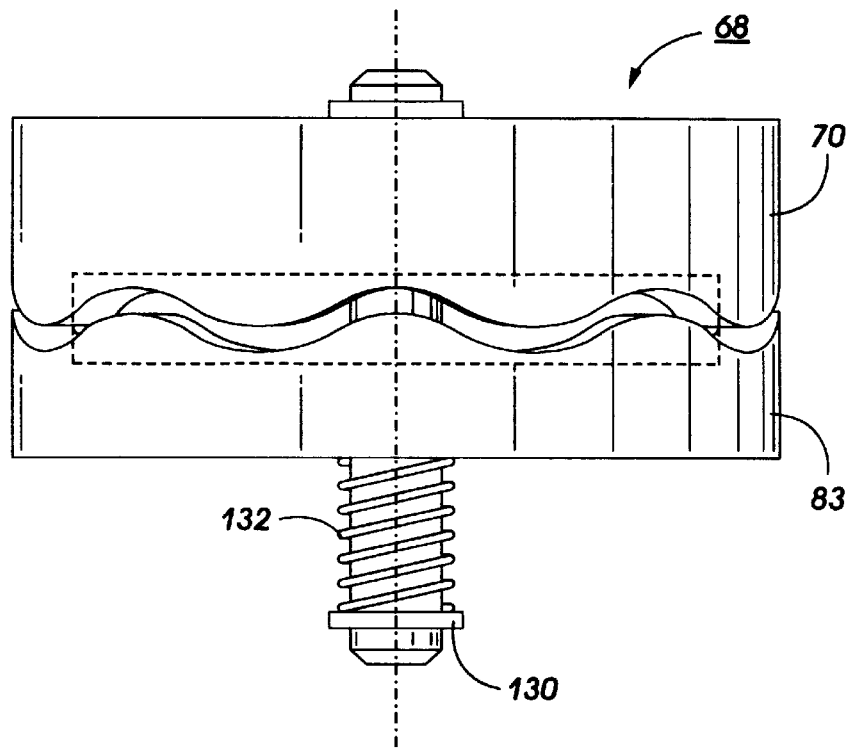
FIG. 6 illustrates a schematic side view of one embodiment of the rotor and stator of the present invention.

As illustrated in a schematic side view of FIG. 6, the valve 68 includes the shaft 115, for instance, as a "D" shaft. The end of the shaft which has been inserted through the stator 83 has coupled thereto an "E" clip 130 for holding the valve together. A spring 132 is placed such that this compression spring provides for the normal sealing forces between each member. These features add up to reduced cost for parts that can be easily molded with increased reliability for standard sealing techniques. As such, the valve of the present invention is not limited to supply of a vacuum but can include the supply of liquids as well.

Figure 7:
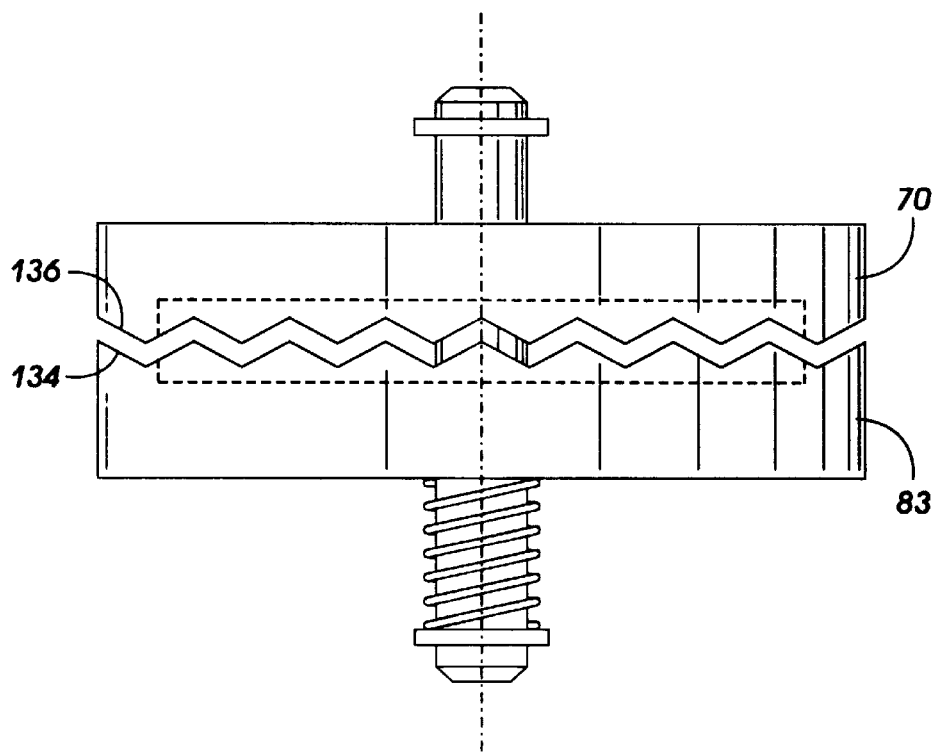
FIG. 7 illustrates a schematic side view of another embodiment of the rotor and stator of the present invention.

FIG. 7 illustrates a second embodiment of the present invention wherein the oscillatory surface of the FIG. 6 illustration is replaced with a saw tooth surface 134 formed on the multiple port member 83 and a saw tooth surface 136 formed on the selecting member 70. By providing a matable saw tooth surface on each of the pieces for members of the valve, complete engagement and disengagement of the O-rings to the dove tailed groove of the projecting member can be achieved. Such a surface, however, dictates that rotational forces necessary to open and close the seals are different than that necessary for the embodiment of FIG. 6. While the rotational forces necessary to break and create a seal are potentially different, the illustration of FIG. 7, however, does offer port registration for multiple ports without an exact positioning method when actuating the rotor to the next port position.

In recapitulation, there has been described a multi-port rotary indexing valve useful in a liquid ink printer for a maintenance system thereof. It is, therefore, apparent that there has been provided in accordance with the present invention, a multiple port valve for selecting between a number of ports provided in a multiple port member by an aperture defined in a selecting member. While this invention has been described in conjunction with a specific embodiment thereof, it is evident that many alternatives, modifications and variations will be apparent to those skilled in the art. The present invention, is therefore, not limited to applications in the maintenance systems of ink jet printers, however, but is equally applicable to any application requiring the transfer of air, fluids or even solids from a single source to multiple inputs. In addition, it is also possible that multiple sources could be coupled to multiple inputs by including a selecting member having two or more apertures included in the projecting portions thereof such that multiple ports of a multiple port member are selected. Furthermore, it's possible that the projecting member be placed on each of the ports of the stator as opposed to the aperture of the rotor. Accordingly, it is intended to embrace all such alternatives, modifications and variations that fall within the spirit and broad scope of the appended claims.

What is claimed is:

1. A multiple port rotary valve, comprising:

a selecting member, defining a first aperture therethrough and a first axis, said selecting member including a first oscillatory surface varying along a direction of said first axis, a first substantially flat surface being offset from at least a portion of said first oscillatory surface, and a projecting portion projecting from said first substantially flat surface and defining a second aperture aligned with the first aperture; and a multiple port member, defining a plurality of ports and a second axis, said multiple port member including a second oscillatory surface varying along a direction of said second axis, and including a second substantially flat surface being offset from at least a portion of said second oscillatory surface, said second oscillatory surface being matable with said first oscillatory surface so that relative movement therebetween aligns the aperture of said selecting member with one of the plurality of ports of said multiple port member, and said projecting portion of said selecting member being aligned with one of the plurality of ports when said first oscillatory surface and said second oscillatory surface are in intimate contact.

2. The multiple port rotary valve of claim 1, wherein said first oscillatory surface circumscribes the first axis.

3. The multiple port rotary valve of claim 1, wherein said second oscillatory surface circumscribes the second axis.

4. The multiport rotary valve of claim 1, wherein said multiple port member comprises a plurality of sealing portions, each of said sealing portions surrounding one of the plurality of ports, providing a seal with said projecting portion when said portion is aligned with one of the plurality of ports.

5. The multiport rotary valve of claim 4, wherein at least one of said sealing portions includes an O-ring.

6. The multiport rotary valve of claim 5, wherein said projecting portion defines a groove, the groove being matable with said O-ring.

7. The multiport rotary valve of claim 1, wherein said first oscillatory surface defines a sine wave.

8. The multiport rotary valve of claim 1, wherein said multiple port member comprises a projecting portion, projecting from said second surface and defining an aperture therethrough aligned with one of the plurality of ports, said projecting portion being aligned with the aperture of said selecting member when said first oscillatory surface and said second oscillatory surface are in intimate contact.

9. The multiport rotary valve of claim 8, wherein said selecting member comprises a sealing portion, said sealing portion surrounding the aperture, providing a seal with said projecting portion when the aperture is aligned with said projecting portion.

10. The multiport rotary valve of claim 9, wherein said sealing portion includes an O-ring.

11. The multiport rotary valve of claim 10, wherein said projecting portion defines a groove, the groove being matable with said O-ring.

12. The multiport rotary valve of claim 1, wherein said first oscillatory surface defines a sine wave.

* * * * *